US008493422B2

(12) United States Patent
Salvestro

(10) Patent No.: US 8,493,422 B2
(45) Date of Patent: Jul. 23, 2013

(54) COLOR FILTER LAYER ALIGNMENT

(75) Inventor: Aldo Salvestro, Burnaby (CA)

(73) Assignee: Kodak Graphic Communications Canada Company, Burnaby (CA)

( * ) Notice: Subject to any disclaimer, the term of this patent is extended or adjusted under 35 U.S.C. 154(b) by 452 days.

(21) Appl. No.: 12/988,679

(22) PCT Filed: Apr. 24, 2008

(86) PCT No.: PCT/IB2008/001025
§ 371 (c)(1),
(2), (4) Date: Oct. 20, 2010

(87) PCT Pub. No.: WO2009/130526
PCT Pub. Date: Oct. 29, 2009

(65) Prior Publication Data
US 2011/0039023 A1    Feb. 17, 2011

(51) Int. Cl.
*B41J 2/447* (2006.01)
*B41M 5/025* (2006.01)

(52) U.S. Cl.
USPC .......................... 347/132; 347/237; 347/172

(58) Field of Classification Search
USPC ............ 347/5, 9, 12, 13, 171, 172, 211, 224, 347/225, 232, 233, 237, 247, 132, 133
See application file for complete search history.

(56) References Cited

U.S. PATENT DOCUMENTS

| 6,177,214 | B1 | 1/2001 | Yokoyama et al. | |
| 6,957,773 | B2 | 10/2005 | Gelbart | |
| 8,330,783 | B2* | 12/2012 | Salvestro | 347/233 |
| 2006/0092436 | A1 | 5/2006 | White et al. | |
| 2010/0128100 | A1* | 5/2010 | Salvestro | 347/171 |
| 2010/0302340 | A1* | 12/2010 | Salvestro | 347/225 |
| 2010/0309273 | A1* | 12/2010 | Salvestro | 347/188 |

FOREIGN PATENT DOCUMENTS

JP    2004-294617    10/2004

* cited by examiner

*Primary Examiner* — Huan Tran
(74) *Attorney, Agent, or Firm* — Nelson Adrian Biish

(57) ABSTRACT

A method is provided to manufacture displays such as, for example, reflective displays, electrophoretic displays or liquid crystal displays. In one embodiment of the invention, a method is provided for aligning a patterned layer of color filter elements with a display assembly. The method includes activating a first set of addressable pixel elements to change an activation state of each pixel element in the first set of the pixel elements. A required alignment of the patterned layer of color filter elements with the display assembly can be determined based at least on the activated first or a second set of the pixel elements. The patterned layer of color filter elements is aligned with the display assembly according to the required alignment.

41 Claims, 8 Drawing Sheets

COLOR FILTER LAYER ALIGNMENT

CROSS REFERENCE TO RELATED APPLICATIONS

This is a U.S. National Stage application under 35 U.S.C. 371 of International Application No. PCT/IB2008/001025, filed Apr. 24, 2008.

FIELD OF THE INVENTION

The present invention relates to color filters used in multi-color display devices, and more particularly, to a method for aligning a patterned layer of color filter elements to a surface of a display assembly. The alignment method can be used in the formation of liquid crystal displays or electrophoretic displays, for example.

BACKGROUND OF THE INVENTION

Many forms of electronic color displays are currently available for the presentation of visual information. This visual information can include color information which is often created in various displays with the use of color filters. For example, liquid crystal displays (i.e. also known as LCD displays) typically include a layer of liquid crystal material disposed between two transparent electrodes. An electric field is applied to the electrodes to cause an alignment of the liquid crystal molecules to change, thereby altering a transmission characteristic of light emitted by the display. LCD displays typically employ color filters to produce colored information from light that is selectively transmitted by the display.

Organic light-emitting diodes (OLED) are a form of light emitting diodes (LED) which contain an emissive electroluminescent layer made up of organic materials. Displays incorporating OLED materials generally do not require a back-light illuminator, and therefore typically consume less power and are thinner than other types of displays such as LCD displays. OLED color displays can include different configurations. For example, in some configurations, the OLED materials directly emit colored light without necessarily requiring a passive color filter. In other configurations, a color filter is used in conjunction with a white OLED source to produce colored information.

Electrophoretic displays typically employ an electric field to cause a movement of charged particles to change a transmissive or reflective state of a pixel of the display. Unlike other conventional displays which employ a backlight to illuminate display pixels, electrophoretic displays mimic ordinary paper with their flexibility and their ability to reflect external light and thus are sometimes referred to as electronic paper or E-paper. Various electrophoretic displays can be controlled to maintain a given outputted image without drawing additional energy. Color information is displayed using various techniques including the use of colored charged particles or colored electrodes. Color filters have also been proposed for use with electrophoretic displays.

Color filters used in display panels typically include various patterns of color elements. Patterns of color filter elements can include patterns of red, green and/or blue color elements, for example. Color filters may be made with color elements of other colors. For example, color filters made up of cyan, magenta and yellow color elements are known. The color filter elements can be arranged in any of various suitable configurations. FIG. 1A shows a portion of a prior art "stripe configuration" color filter 10 having a plurality of red (R), green (G) and blue (B) color filter elements 12A, 12B and 12C respectively formed in alternating columns across a surface 13. As described herein, color filter elements such as color filter elements 12A, 12B and 12C are collectively referred to as color filter elements 12. In this case, color filter 10 corresponds to an LCD color filter which includes a color filter black matrix 15 (also referred to as matrix 15). Reflective displays such as electrophoretic displays need not include matrix 15. FIG. 1A shows that the various color filter elements 12 can be formed by elongated stripes that are subdivided by matrix cells 17 (also referred to as cells 17) into the individual color filter elements.

The stripe configuration shown in FIG. 1A illustrates one example configuration of color filter elements. Color filters may have other configurations. Mosaic configurations have color elements that alternate in both directions (e.g. along columns and rows) such that each color element resembles an "island". Delta configurations (not-shown) have groups of different color elements arranged in a triangular relationship to each other. Mosaic and delta configurations are examples of "island" configurations. FIG. 1B shows a portion of a prior art color filter 10 arranged in a mosaic configuration in which color filter elements 12A, 12B and 12C are arranged in columns and alternate both across and along the columns. Whereas the illustrated examples described above show patterns of rectangular shaped color filter elements, patterns including elements made up of other shapes are also known. These shapes can include triangular or chevron shapes, for example.

Color filters can be formed by various methods on various substrates employed in associated displays. Conventional techniques include photolithographic processes, electrochemical processes, and printing process (e.g. inkjet printing), for example. Direct exposure processes (e.g. laser-induced thermal transfer processes) have also been proposed. In some manufacturing techniques, when laser-induced thermal transfer processes are used to produce a color filter, a color filter substrate also known as a receiver element is overlaid with a donor element that is then image-wise exposed to selectively transfer a colorant from the donor element to the receiver element. Preferred exposure methods use radiation beams such as laser beams to induce the transfer of the colorant to the receiver element. Diode lasers are particularly preferred for their low cost and small size.

Laser induced "thermal transfer" processes include: laser induced "dye transfer" processes, laser-induced "melt transfer" processes, laser-induced "ablation transfer" processes, and laser-induced "mass transfer" processes. Colorants transferred during laser-induced thermal transfer processes can include suitable dye-based or pigment-based compositions. Additional elements such as one or more binders may be transferred.

The final visual quality of a color display is highly dependant on maintaining a required alignment between the color filter elements and the pixel elements of the display (e.g. electrode structures or other active components) which control the activation of a display color pixel corresponding to a given color filter element. The achievement of this required alignment can be adversely affected by various factors. For example, although glass has been used as a common substrate material in various display components, there is an increased desire to employ alternate substrates such as plastics especially when factors such as increased flexibility and lower costs are further required of the display. When compared with glass, many plastics can undergo greater dimensional changes and distortions when exposed to varying environmental factors such as temperature and humidity. Additionally, or alternatively, plastic substrates may undergo dimensional changes and distortions under the influence of various processing steps used to form the displays. A required color filter alignment can therefore be difficult to achieve when it is desired that a patterned layer of color filter elements be aligned with, or be formed in alignment with a surface of a display assembly.

The material characteristics of various display substrates are not the only factors that can limit the final alignment of a color filter layer with a display assembly. For example, it can be difficult to visually align to the various display electrodes especially if the optical requirements of the display require the electrodes to be substantially transparent or colorless. Conversely, the relative opacity of various display elements can hinder the achievement of a desired color filter alignment. For example, a desired alignment between a color filter layer and various pixel electrodes of an electrophoretic display can be hindered by the opacity of the electrophoretic medium that is disposed between the two.

There remains a need for effective and practical methods and systems that facilitate a desired alignment between a patterned layer of color filter elements and other elements of a display assembly.

There remains a need for effective and practical methods and systems that facilitate the formation of a patterned layer of color filter elements onto a display assembly with a desired alignment with other elements of the display assembly.

SUMMARY OF THE INVENTION

The present invention relates to the manufacture of displays such as, for example, reflective displays, electrophoretic displays or liquid crystal displays. The invention relates to a method for forming a patterned layer of color filter elements on a display assembly while effecting relative movement between the display assembly and a print head. The patterned layer of color filter elements can be formed by a laser-induced thermal transfer process such as a laser-induced dye-transfer process, a laser induced mass transfer process or by other means of transferring material from a donor element to a surface of the display assembly. The patterned layer of color filter elements can be formed by transferring image forming material to a surface of the display assembly in an inkjet process.

In one embodiment of the invention, a method is provided for aligning a patterned layer of color filter elements with a display assembly. The method includes activating a first set of addressable pixel elements to change an activation state of each pixel element in the first set of the pixel elements. One activation state can be, but is not necessarily, an on state. The activation state of each pixel element in the first state can be changed to be different from an activation state of each pixel element in a second set of pixel elements. The activation state can be changed by applying one or more activation signals to each pixel element. A required alignment of the patterned layer of color filter elements with the display assembly can be determined based at least on the activated first set of the pixel elements or the second set of the pixel elements. The patterned layer of color filter elements is aligned with the display assembly according to the required alignment.

In one embodiment, a first set of pixel elements is activated differently from a second set of pixel elements to cause light to be selectively transmitted or differently reflected from different regions of a surface of the display assembly.

A patterned layer of color filter elements can be formed on a surface of the display assembly using one of the methods described above. The patterned layer can be formed while maintaining at least one of the pixel elements with an activation state that is different from the activation state of another of the pixels elements. A sensor can be used to detect the activated pixel elements. An illuminator can be used to illuminate surface of the display or the activated pixel elements.

A print head comprising a plurality of individually addressable channels can be operated to direct radiation beams towards the surface of the display assembly to form an image thereon. Image forming material can be transferred to the surface of the display assembly to form an image. The activation timing of a portion of the channels can be adjusted while forming the patterned layer of color filter elements on the surface of the display assembly.

A motion system can be used to effect relative movement between the print head and the display assembly while forming an image on the surface, and the relative movement between the print head and the display assembly can be adjusted while forming the patterned layer of color filter elements on the surface of the display assembly. The relative speed between the print head and the display can be adjusted. The print head can be reoriented with respect to a scan direction.

An image sensor can be provided for capturing an image of a portion of the surface and a positional relationship between the radiation beams and the image sensor can be determined.

In one embodiment of the invention, a method is provided for forming a plurality of color filter elements on a display assembly that includes a plurality of addressable pixel elements. The method includes supporting the display assembly and a donor element positioned on the display assembly on a support. A first set of the pixel elements is activated to change an activation state of each pixel element in the first set. A sensor is used to detect the first set of the pixel elements and alignment information is determined based at least on the detected first set of the pixel elements. A print head is operated to emit radiation beams to image the donor element. During the imaging, image forming material is transferred from the donor element to the display assembly to form the plurality of color filter elements on the display assembly. The print head is controlled to image the donor element with information that includes at least the alignment information.

In another embodiment, an apparatus for forming a plurality of color filter elements on a surface of a display assembly is provided and includes a support adapted to receive the display assembly. A print head is provided which includes an arrangement of channels. Each of the channels is adapted to form a portion of an image on the surface of the display assembly. Control circuitry can be provided to activate a first set of addressable pixel elements to change an activation state of each pixel element in the first set of the pixel elements. A sensor can be provided for detecting the activated first set of pixel elements. A controller, which can include one or more controllers, can be programmed for determining alignment information based at least on the detected activated first set of pixel elements, and for controlling the print head to form the plurality of color filter elements on the surface of the display assembly in accordance with the alignment information. The controller can be programmed to adjust activation timing of a portion of the channels in accordance with the alignment information. A motion system can be provided for effecting relative movement between the print head and the display assembly. The controller can be programmed to control the motion system to adjust the relative movement between the print head and the display assembly in accordance with the alignment information.

The print head can be adapted to form the image on the surface of the display assembly while scanning over the surface along a scan direction. The controller can be programmed to control an actuator to adjust an orientation of the arrangement of channels relative to the scan direction in accordance with the alignment information. The print head can be adapted to cause image forming material to be transferred to the surface of the display assembly to form the plurality of color filter elements. The image can be formed by a print head which emits radiation beams to cause image forming material to be transferred from a donor element to the surface of the display assembly to form the plurality of color filter elements.

In another embodiment, a method for aligning a patterned layer of color filter elements with a display assembly includes activating a first set of addressable pixel elements to have an activation state that differs from an activation state of a second set of pixel elements. Alignment information is determined based at least on one of the activated first set of the pixel elements and the second set of the pixel elements. The patterned layer of color filter elements is aligned with the display assembly according to the alignment information. A sensor can detect at least one pixel element in at least one of the activated first set of the pixel elements and the second set of the pixel elements. An image capture device can capture an image of at least one pixel element in at least one of an activated first set of the pixel elements and a second set of the pixel elements. The patterned layer of color filter elements can be formed on a surface of the display assembly while aligning the patterned layer with the display assembly according to the alignment information.

DETAILED DESCRIPTION OF THE INVENTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense. Additionally, the drawings may not be necessarily to scale, and portions thereof may be exaggerated for clarity.

Figure 2A:
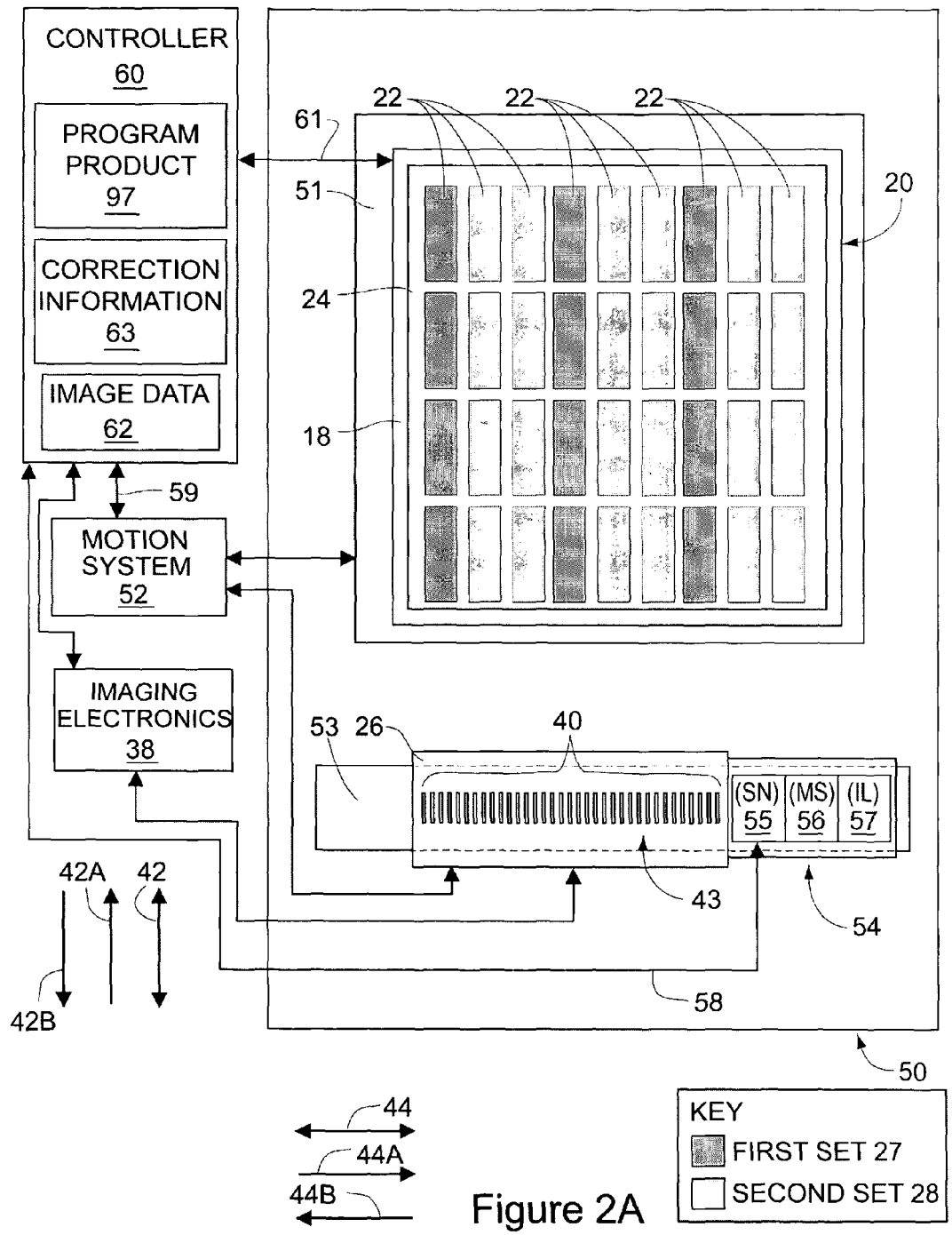
FIG. 2A is a schematic plan view of an apparatus as per an example embodiment of the invention which is adapted to receive a display assembly in which various pixel elements of the display assembly are activated.
Figure 2B:
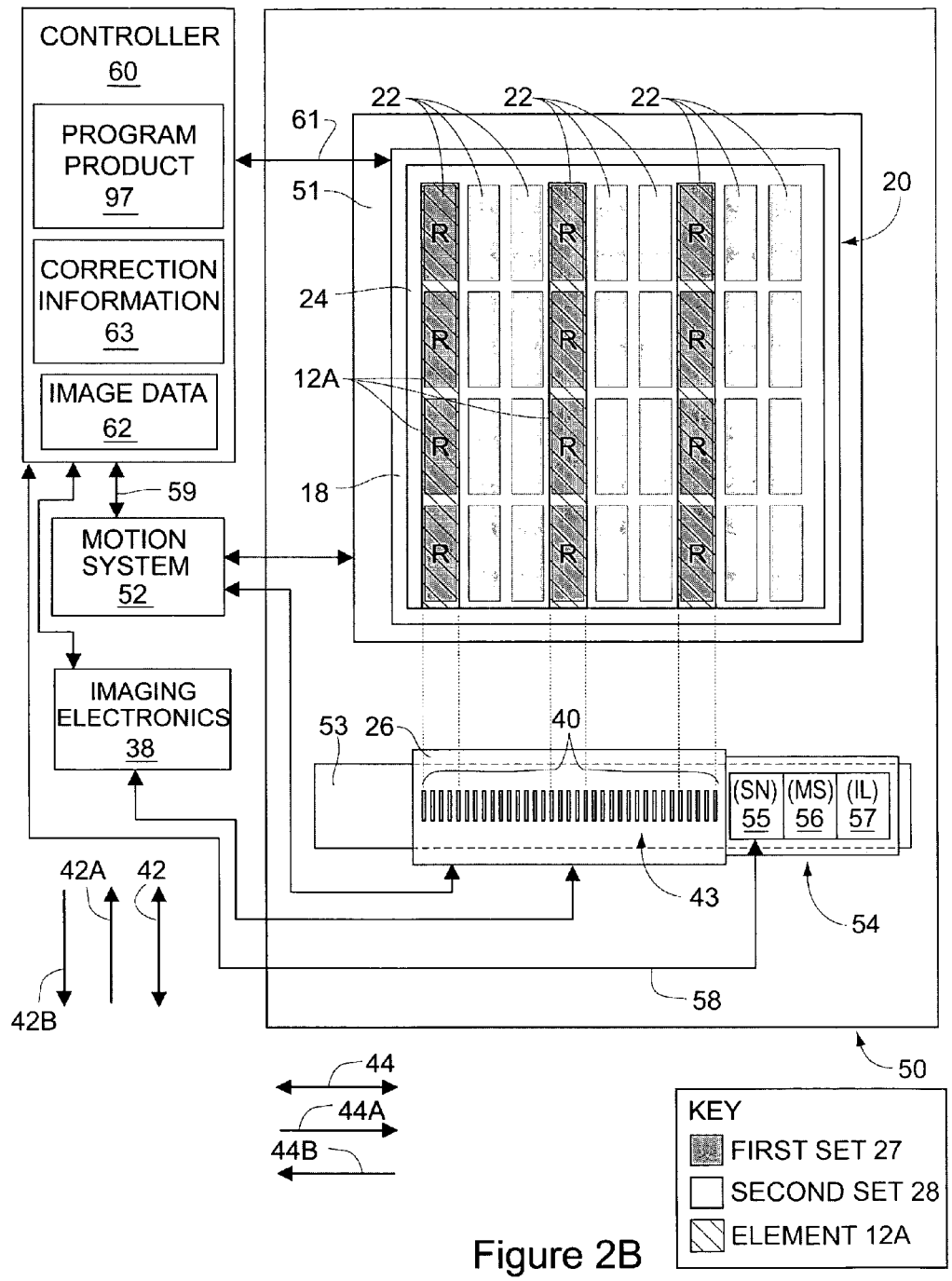
FIG. 2B is a schematic plan view of the apparatus of FIG. 2A forming a patterned layer of color filter elements in alignment with the display assembly as per an example embodiment of the invention.
Figure 2C:
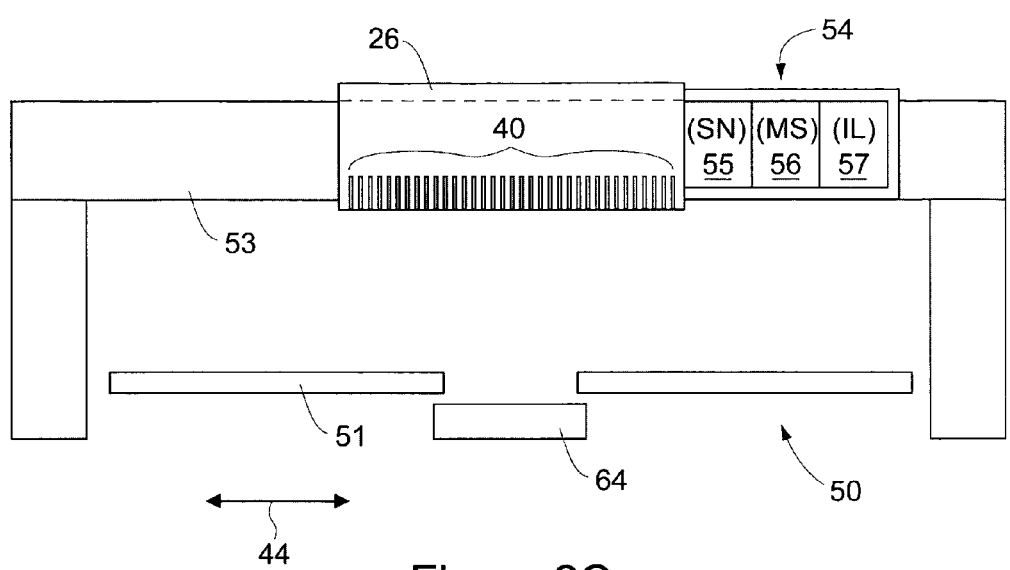
FIG. 2C is a schematic partial side view of the apparatus shown in FIG. 2A.

An apparatus 50 used in an example embodiment of the invention is schematically shown in FIGS. 2A, 2B and 2C. Apparatus 50 employs exposure techniques to form a patterned layer of color filter elements 12 in alignment with a display assembly 20. Exposure techniques can employ beams of radiation to form an image. These images can be formed in various ways. For example, exposure techniques can be used to change a property or characteristic of an image modifiable layer to form an image thereon. Exposure techniques can be used to ablate a surface to form an image thereon. Exposure techniques can be used to facilitate a transfer of image forming material to a surface to form an image thereon. However, it is to be understood that the present invention is not limited to the formation of color filters with exposure processes and other suitable image forming processes are also within the scope of the present invention. For example, image forming techniques that can readily adjust the formation of various imaged features in response to a determined characteristic of the display are particularly well suited to the present invention. These image forming techniques can include various inkjet printing techniques, for example.

In this illustrated embodiment a thermal transfer process is employed. A print head 26 comprising a radiation source (not shown) such as a laser is provided to transfer image-forming material (also not shown) from a donor element 24 to a surface 18 of display assembly 20. Donor element 24 is shown as being smaller than surface 18 for clarity. However, donor element 24 may overlap one or more portions of surface 18 as may be required. Print head 26 can include one or more channels 40. In this case, print head 26 includes an arrangement (i.e. channel array 43) of channels 40; each of the channels 40 being individually controllable to emit radiation beams. Imaging electronics 38 control the emission of radiation beams from channels 40 in accordance with image data 62 provided by controller 60.

The image-forming material is image-wise transferred onto the surface 18 when radiation beams emitted by print head 26 are directed towards display assembly 20. When thermal transfer techniques are employed different patterns of color filter elements 12 are typically formed in separate exposure steps; each exposure step involves replacing the preceding color donor element with the next color donor element to be imaged. After the various color filter elements 12 have been transferred, the formed color filter 10 can be subjected to one or more additional process steps, such as the addition of one or more other layers (not shown) which can be used to protect color filter 10, for example.

The radiation beams generated by print head 26 are directed towards surface 18 while being image-wise modulated according to image data 62 specifying the image to be written. Groups of channels 40 are driven to produce radiation beams wherever it is desired to form an image feature. Channels 40 not corresponding to the image features are controlled so as not to image corresponding areas.

In this illustrated embodiment, display assembly 20, print head 26, or a combination of both, are moved relative to one another while channels 40 are controlled in response to image data 62 to scan the radiation beams over donor element 24 to form an image on surface 18. In some cases, print head 26 is stationary and display assembly 20 is moved. In other cases, display assembly 20 is stationary and print head 26 is moved. In still other cases, both the print head 26 and display assembly 20 are moved. In some example embodiments of the invention, print head 26 exposes surface 18 in a step and repeat fashion. In these embodiments, relative movement between print head 26 and display assembly 20 can occur between shots of exposure. In some cases, surface 18 can be too large to be imaged within a single exposure or scan. Multiple exposures or scans of print head 26 can be required to complete an image on surface 18.

Any suitable mechanism may be applied to move print head 26 relative to display assembly 20. Flat bed marking systems are typically used for forming images on surfaces comprising a substantially flat orientation. U.S. Pat. No. 6,957,773 to Gelbart describes a high-speed flatbed imager suitable for display panel exposure. In some example embodiments, suitably flexible display assemblies can be secured to either an external or internal surface of a "drum-type" support to affect the forming of images on the display assemblies.

In FIG. 2A, display assembly 20 is shown supported on a moveable media support referred to as carrier 51. Carrier 51 is operable for conveying display assembly 20 along a path aligned with main-scan axis 42. In this embodiment, display assembly 20 is movable along forward direction 42A and along reverse direction 42B. Forward direction 42A is opposite to reverse direction 42B. Display assembly 20 can reciprocate between forward direction 42A and reverse direction 42B. Print head 26 is movably supported on support 53 which straddles carrier 51. In this example embodiment, print head 26 is movable along a path aligned with sub-scan axis 44. In this embodiment, print head 26 can move along away direction 44A and along home direction 44B. Away direction 44A is opposite to home direction 44B. In this illustrated embodiment, print head 26 can bi-directionally scan radiation beams over donor element 24 to form an image on surface 18. Bidirectional scanning techniques can enhance exposure productivity since scans can be made in each of the opposing scan directions.

Motion system 52 can include one or more motion systems. Motion system 52 can include suitable drives, transmission members and/or guide members that are provided to cause the motion of carrier 51 and/or print head 26. Those skilled in the art will realize that separate motion systems can also be used to operate different systems within apparatus 50.

Controller 60, which can include one or more controllers, is used to control one or more systems of apparatus 50 including but not limited to motion system 52. Controller 60 can transfer image data 62 to the print head 26 and control the print head to emit radiation beams in accordance with this data. Controller 60 can also control systems other than apparatus 50. Controller 60 can be used to control various sensors and illumination sources. These various systems can be controlled using various control signals and/or implementing various methods. Controller 60 may be configured to execute suitable software and may include one or more data processors, together with suitable hardware, including by way of non-limiting example: accessible memory, logic circuitry, drivers, amplifiers, A/D and D/A converters, input/output ports and the like. Controller 60 may comprise, without limitation, a microprocessor, a computer-on-a-chip, the CPU of a computer or any other suitable microcontroller. Controller 60 can be associated with a materials handling system.

Figure 3:
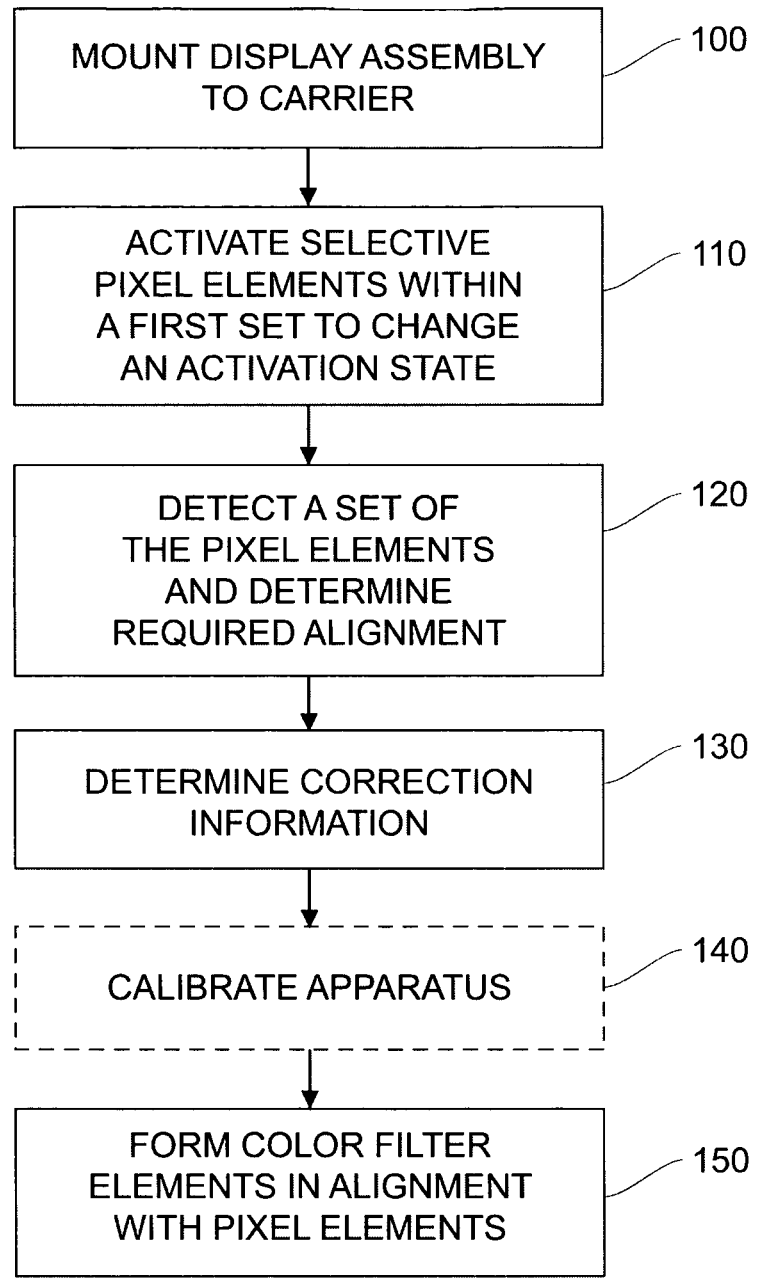
FIG. 3 is a flow chart representing a method practiced in accordance with an example embodiment of the invention.

FIG. 3 shows a flow chart representative of a method of forming a layer of color filter elements in alignment with display assembly 20 as per an example embodiment of the invention. The various steps illustrated in FIG. 3 are described with reference to apparatus 50 as shown in FIGS. 2A, 2B and 2C. This is for the purpose of illustration only and other suitable image forming apparatus can be used with the present invention. In step 100, display assembly 20 is mounted onto carrier 51. Display assembly 20 can be secured to carrier 51 by a variety of suitable techniques. For example, various clamping members or a low pressure source (e.g. a vacuum source) can be used.

Display assembly 20 includes a plurality of individually addressable pixel elements 22, wherein each of the pixels elements 22 can be activated to control a particular activation state of that pixel element. An activation state can include a modifiable property or state associated with a given pixel element 22 that can be varied or changed in accordance with a corresponding change in the activation of the pixel element 22. For example, each pixel element 22 can be controlled by various control signals to change an optical property such as a transmission or reflectance property associated with that the pixel element. Each pixel element 22 can be controlled to change other properties or states as required by the operation of display assembly 20. It is desired that a color filter element 12 be aligned, or be formed with a desired alignment with each of the pixel elements 22 to form corresponding colored pixels of the display. Accordingly, it is further desired that patterned layers of color filter elements 12 be aligned, or be formed with a desired alignment with corresponding patterns of pixel elements 22.

Figure 1A:
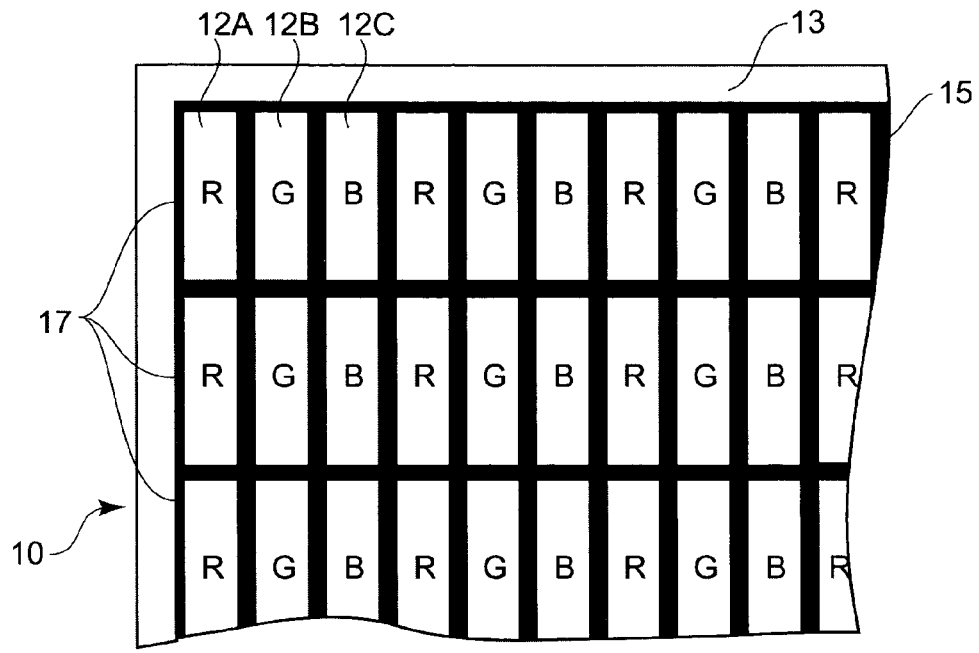
FIG. 1A is a plan view of a portion of a prior art color filter.
Figure 1B:
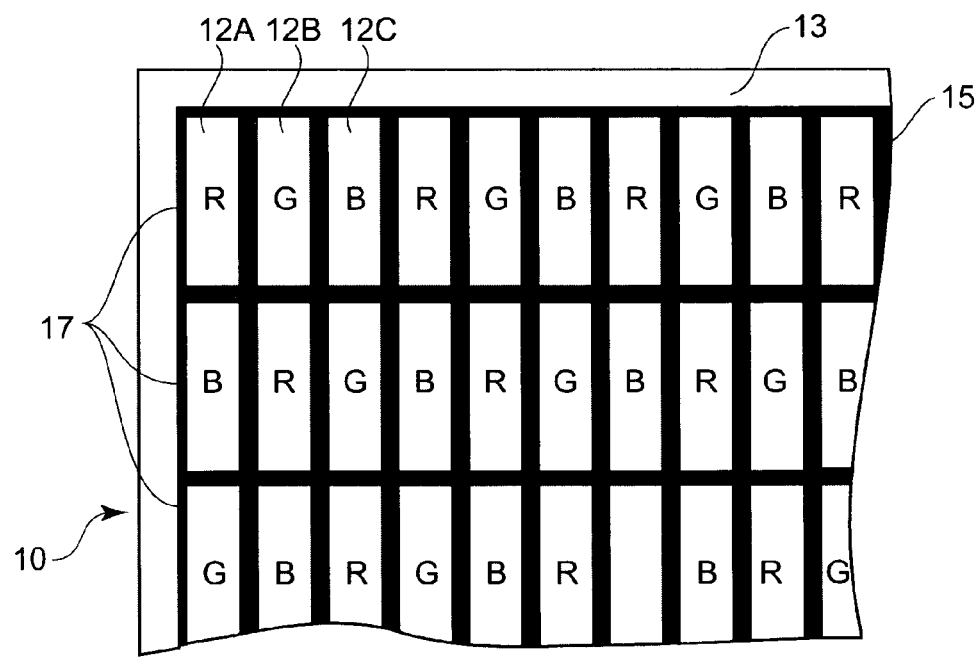
FIG. 1B is a plan view of a portion of another prior art color filter.
Figure 1C:
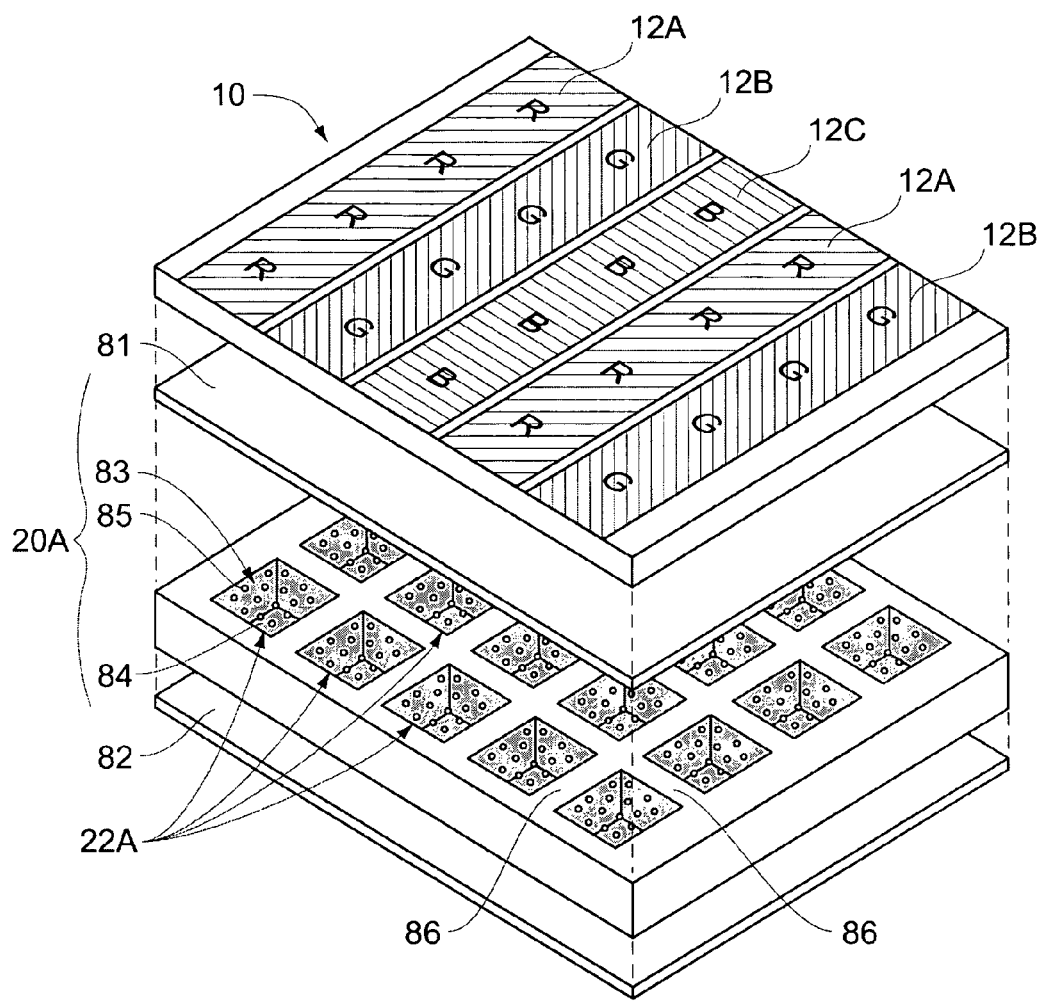
FIG. 1C shows an exploded perspective view of a prior art electrophoretic display that includes an electrophoretic display assembly and a color filter.

Pixel elements 22 can include various configurations. These configurations can vary in accordance with the display type into which they are incorporated. For example, FIG. 1C schematically shows an exploded perspective view of a conventional electrophoretic display that includes a color filter 10 and an electrophoretic display assembly 20A. Electrophoretic display assembly 20A includes a plurality of pixel elements 22A that are arranged in a matrix corresponding to a pixel arrangement that is desired in the completed display. In this case, electrophoretic display 20A includes an electrode plate 81, an electrode plate 82 and an electrophoretic medium 83 disposed between them. Electrode plates 81 and 82 include various electrodes for the individual activation of each of the pixel elements 22A. Electrode plate 81 is transparent and can be colorless. Electrophoretic medium 83 includes a dielectric fluid 84 into which charged particles 85 are dispersed. In this case each of the pixel elements 22A is characterized by a cell of the electrophoretic medium 83; the cell in turn being created by partitions 86. Partitioning electrophoretic medium 83 can be used to reduce undesired migrations of charged particles 85 within dielectric fluid 84.

A color display is produced by combining electrophoretic display assembly 20A with a color filter 10. The combination of electrophoretic display assembly 20A and color filter 10 can be controlled to create patterns of pixels of a desired color as required by the operation of the final display. For example, the application of a voltage across the two electrodes plates 81 and 82 can cause a migration of charged particles 85 towards or away from transparent electrode plate 81. In some cases, the charged particles 85 can be lightly colored (e.g. white) whereas dielectric fluid 84 can be darkly colored (e.g. black). A specifically colored display pixel can be activated by selectively applying a voltage to a corresponding pixel element 22A that is appropriately aligned with a corresponding color filter element 12. For example, when the color filter element 12 is red in color (i.e. color element 12A in this case), and a corresponding pixel element 22A is controlled to cause lightly colored charged particles 85 to migrate towards the electrode plate 81, a red color pixel will be visible when external light transmitted through color filter element 12A is reflected back by the lightly colored particles 85. Conversely, when the pixel element 22A is controlled to cause charged particles 85 to migrate towards the electrode plate 82, a dark colored pixel will be visible when external light that is transmitted through color filter element 12A is absorbed by the darkly colored dielectric fluid 84. Those skilled in the art will appreciate that many other suitable configurations of electrophoretic display assemblies 20A can be used with color filters 10 to produce colored displays. Without limitation, other suitable electrophoretic display assemblies 20A can include particles that include different colors, particles that include different charges, and different electrode configurations.

Figure 1D:
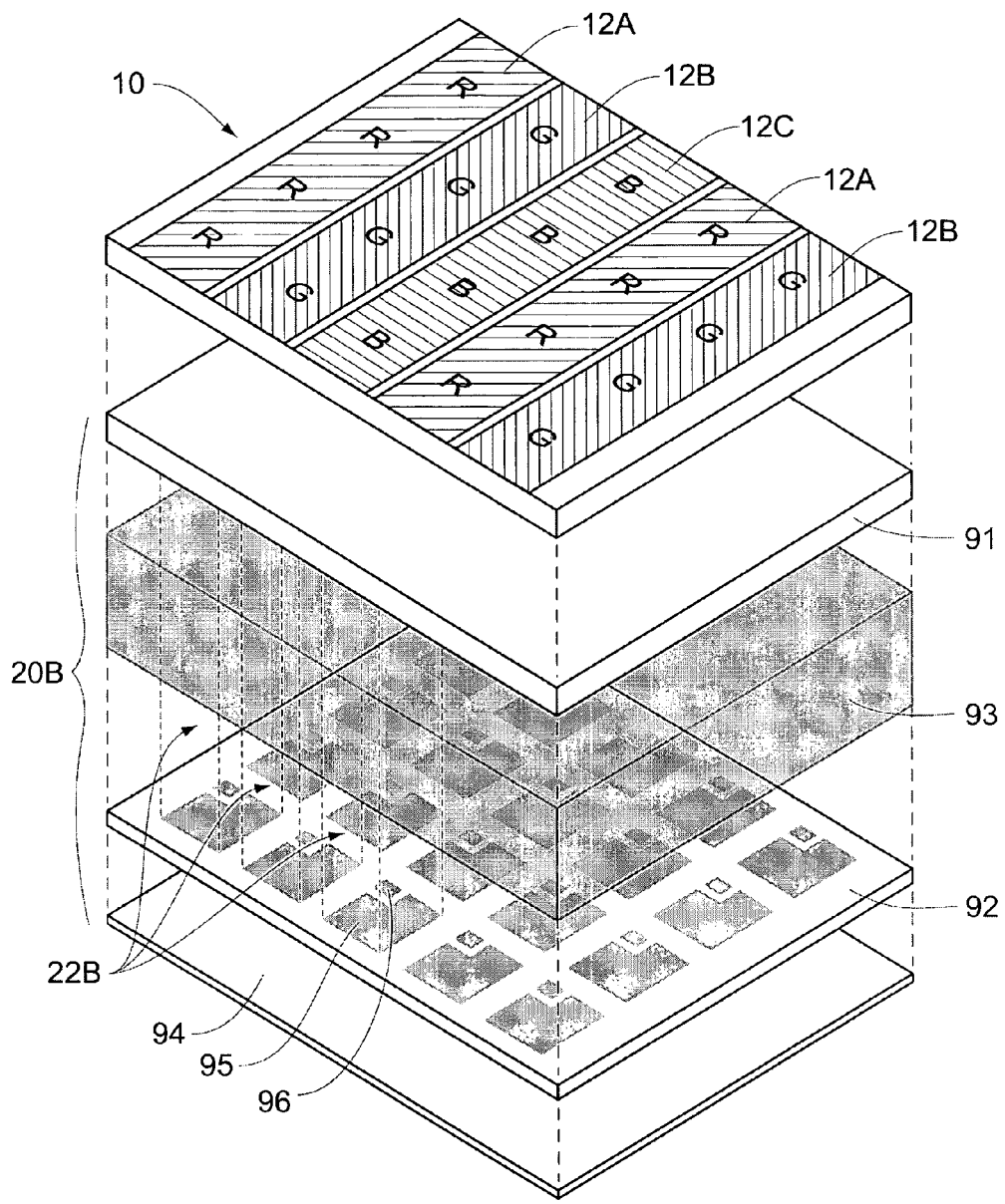
FIG. 1D shows an exploded perspective view of a prior art liquid crystal display that includes a liquid crystal display assembly and a color filter.

Liquid crystal display assemblies can also be used by the present assembly. FIG. 1D schematically shows an exploded perspective view of a conventional liquid crystal display that includes a liquid crystal display assembly 20B and a color filter 10. Liquid crystal display assembly 20B includes a plurality of pixel elements 22B that are also arranged in a matrix corresponding to a pixel arrangement that is desired in the completed display. In this case, liquid crystal display assembly 20B includes a transparent electrode plate 91, a thin film transistor (TFT) plate 92 and a layer of liquid crystal medium 93 disposed between them. Liquid crystal display assembly 20B also includes an illuminator such as backlight 94. A plurality of polarizing elements (not shown) is typically disposed between backlight 94 and color filter 10. Each of the pixel elements 22B corresponds to a pixel electrode 95 and transistor 96 on TFT plate 92, a common electrode (not shown) on electrode plate 91 and a portion of the liquid crystal medium 93. A color display is formed by appropriately aligning a color filter 10 with liquid crystal display assembly 20B. A colored pixel is generated in the assembled display by applying voltage across a pixel electrode 95 and the common electrode to cause a realignment of various molecules of the liquid crystal medium 93 located between the electrodes. The amount of light that is transmitted from backlight 94 to a corresponding color filter element 12 to generate a desired colored pixel in the display is determined by the realignment of the liquid crystal molecules. Those skilled in that art will realize that other types of display assemblies 20 can be combined with color filters 10 to produce colored displays. Accordingly, the present invention is not limited electrophoretic or liquid crystal display assemblies and can include suitable display assemblies 20 that comprise a plurality of individually controllable pixel elements 22. Each of the pixel elements 22 is individually controllable between different activation states to cause colored light to be selectively viewable from corresponding color filter elements 12.

In some example embodiments of the invention, mounting display assembly 20 to carrier 51 can include enabling various circuit connections that permit one or more activation signals 61 to be communicated to various pixel elements 22 of the display assembly 20. Activation signals 61 are used to selectively change an activation state of the pixel elements 22. In some example embodiments of the invention, activation signals 61 are communicated to display assembly 20 after it has been mounted on carrier 51. In some example embodiments of the invention, activation signals 61 are communicated to display assembly 20 before it has been mounted onto carrier 51. For example, various electrophoretic display assemblies can maintain a particular activation state without additional energization when that activation state has been achieved. Various pixel elements 22 in some of these display assemblies can be selectively activated and then mounted onto carrier 51.

In step 110, a first set 27 of pixel elements 22 is selectively activated in accordance with activation signal(s) 61 to change an activation state of the pixel elements 22 in the first set 27. In this example embodiment of the invention, the pixel elements 22 in the first set 27 are activated to have a different activation state than a second set 28 of pixel elements 22 in the matrix of pixel elements 22. For clarity, pixel elements 22 that are included in first set 27 and pixel elements 22 in second set 28 are shaded in accordance with the KEY shown in FIGS. 2A and 2B. Various control circuitry as known in the art can be used to provide signals 61 to the pixel elements 22, and this control circuitry can vary as a function of the type of display assembly 20 that the pixel elements 22 form part of. In this illustrated embodiment, activation signals 61 are communicated between controller 60 and pixel elements 22. In other example embodiments of the invention, activation signals 61 are communicated between pixel elements 22 and controllers other than controller 60. These other controllers need not control a function of apparatus 50. The first set 27 of pixels elements 22 is activated to facilitate a subsequent formation of one or more patterned layers of color filter elements 12 with the display assembly 20. In this illustrated embodiment of the invention, first set 27 includes various columns of pixel elements 22 which are activated to change an activation state thereof. The columns of activated pixel elements 22 can correspond to columns of pixels of a given color that are to be formed in the final display (e.g. a stripe configuration display).

Each of the pixel elements 22 can be activated between different activation states. For example, a pixel element 22 can be activated to an "on" state in which colored light would be viewable from an associated color filter element 12. A pixel element 22 can be activated to an "off" state in which colored light would not be substantially viewable from an associated color filter element 12. It is to be noted that in some displays, leakage effects may cause some light to still be visible when a given pixel element 22 is activated to an off state but this amount of light will differ from the light that is visible when the pixel element 22 is activated to an on state. In some cases, a given pixel element 22 can be activated between different activation states in which the amount of light that would be viewable from an associated color filter element 12 would vary with the particular activation state. For example more than two different activation states can be used to create different tonal or grayscale values.

In some example embodiments of the invention, the activation state of the pixel elements 22 of one of the first set 27 and the second set 28 can be on while the activation state of the pixel elements 22 in the other of the first set 27 and the second set 28 can be off. In some example embodiments of the invention, the pixel elements 22 of the first set 27 and the second set 28 can be respectively activated to different activation states. The different activation states can be used to distinguish the first set 27 from the second set 28. For example, the different activation states can be used to cause different light, different colored light or different amounts of light to be visible from the pixel elements 22 of the first set 27 and the pixel elements 22 of the second set 28.

In step 120, one or more sets of the pixel elements 22 is detected and required alignment of a patterned layer of color filter elements 12 with display assembly 20 is determined. In some example embodiments of the invention, pixel elements 22 which have a particular activation state are detected. In some example embodiments of the invention, pixel elements 22 that have different activation states are detected. In some example embodiments of the invention, various pixel elements 22 which were activated to change their activation state are detected while in other embodiments various pixel elements 22 whose activation state was not changed are detected. In this example embodiment of the invention, at least the activated first set 27 of pixel elements 22 is detected. In various example embodiments of the invention, geometric information describing various pixels elements 22 is determined. In this illustrated embodiment of the invention, apparatus 50 includes sensor 55 (i.e. shown as (SN) 55) which is operable for detecting various pixel elements 22. In this example embodiment of the invention, sensor 55 detects a particular pixel element 22 prior to the placement of donor element 24 onto surface 18. In other example embodiments, detection may occur after the placement of donor element 24 onto surface 18.

Sensor 55 can be chosen such that the particular activation state of a pixel element 22 is more easily detectable than another activation state of the pixel element. Alternatively, sensor 55 can be chosen such that different activation states are each easily detectable. Without limitation, sensor 55 can include optical and electrical elements. In some example embodiments of the invention, sensor 55 can include an image capture device. In this illustrated embodiment of the invention, sensor 55 is a CCD sensor. CCD cameras can be employed to capture images of various pixel elements 22, including those whose activation state has been changed. In this illustrated embodiment, sensor 55 is part of vision system 54. In this illustrated embodiment, vision system 54 moves with print head 26 along support 53. Vision system 54 can include various components to assist sensor 55 in the detection of a pixel element 22. In this illustrated embodiment, vision system 54 includes microscope 56 (i.e. shown as (MS) 56) and illuminator 57 (i.e. shown as (IL) 57). Illuminator 57 can be used to illuminate surface 18. Illuminator 57 can be used to illuminate a pixel element 22 while the pixel element is being detected by sensor 55. Illuminator 57 includes a source of radiation which can be emitted towards display assembly 20. Illuminator 57 can be required for various reasons. For example, in the case of reflective-type display assemblies (e.g. an electrophoretic display) a particular activation state in a pixel element 22 may require external illumination in order to be detected. Alternatively, even if the display assembly 20 includes an internal light source (e.g. a liquid crystal display), external illumination can be required to amplify light that is transmitted by a given pixel element 22 to a level sufficient for detection by sensor 55. In this illustrated embodiment of the invention, illuminator 57 comprises a flash.

In this illustrated embodiment of the invention, sensor 55 detects a particular pixel element 22 by relatively positioning sensor 55 in a vicinity of the pixel element. Relative positioning can include moving one, or both of sensor 55 and carrier 51 onto which display assembly 20 is mounted. Sensor signals 58 are communicated between sensor 55 and controller 60 in accordance with the detection of the particular pixel elements 22. Various encoder signals 59 provided by motion system 52 are communicated to controller 60 to identify a position of carrier 51 and sensor 55.

In this illustrated embodiment, various pixel elements 22 in the first set 27 are hunted for. The operation of illuminator 57 and sensor 55 is synchronized with motion system 52. For example, when motion system 52 positions various portions of display assembly 20 under a microscope 56, illuminator 57 is triggered to generate an illuminating flash of light for a specific distance as the CCD in sensor 55 captures an image during the positioning. As speed of the motion system increases, a brighter flash of light is triggered. In this example embodiment of the invention, print head 26 and associated vision system 54 are positioned at various locations aligned with sub-scan axis 44. As motion system 52 moves display assembly 20 along a path aligned with main-scan axis 42, vision system 54 captures a series of multiple images at specific determined points on display assembly 20. This process is referred to as "dynamic capture".

Typically, since the field of view of microscope 56 is small, apparatus 50 must perform a multi-image hunt for various pixel elements 22 in first set 27. Geometric location software (e.g. Adept Hexsight, distributed by Adept Technologies, Inc. of Livermore Calif.) is used to determine if, and where a particular pixel element 22 appears in each captured image. Inputs to this software can include information describing how a pixel element 22 would appear, as well as the captured image coordinates. In some cases, the software includes information describing how a particular pixel element 22 having a particular activation state would appear.

A typical hunt can include moving vision system 54 to a first sub-scan position where sensor 55 dynamically captures a column of images as display assembly 20 is moved along a path aligned with main-scan axis 42. If the geometric location software determines that only part of a particular pixel element 22 (or no pixel element at all) is detected, motion system 52 positions vision system 54 to a next sub-scan position and another column of images is dynamically captured and analyzed. This process can be repeated until a desired number of the pixel elements 22 are located.

In some example embodiments of the invention, the hunting process is continued until all of the pixel elements 22 comprising a particular activation state are searched for. In some example embodiments, a predetermined number of the pixel elements 22 comprising a particular activation state are searched for. In some example embodiments, determined information corresponding to various detected pixel elements 22 is used to derive, or aid in the derivation of the location of other pixel elements 22. For example, data comprising expected positional information of pixel elements 22 having a particular activation state can be used by controller 60 to control motion system 52 to move vision system 54 to an estimated location in which those pixel elements 22 would be positioned in the field of view of microscope 56 with little or no hunting. This process can be used to capture images of various pixel elements 22 in a more expeditious manner.

Analysis of the information can be used to determine if the arrangement of pixel elements 22 in display 20 suffers from various geometric distortions. Such distortions can occur for various reasons including material related and process related factors associated with the manufacture of display assembly 20 as well as environmental factors such as temperature and humidity, for example.

In step 130, correction information 63 is determined by controller 60 to account for distortions associated with an expected size or shape of a particular pixel element 22, or distortions associated with an expected positional requirement of an arrangement of the pixel elements 22. Correction information 63 can be used by controller 60 to adjust a formation of various color filter elements 12 to account for the distortions associated with associated pixel elements 22 of the display assembly 20. The corrections can be linear or non-linear in nature and can be implemented by various techniques. For example, main-scan distortions can be corrected by adjusting the activation timing of various channels 40 of print head 26. Adjustments can include advancing or delaying the activation of a given channel 40 with respect to another channel 40. Various channels 40 can be controlled to offset a formed image portion with respect to another image portion. The activation timing of various channels 40 can be adjusted at various locations as print head 26 is repositioned along a path aligned with sub-scan axis 44. These locations can correspond to various distortions located in the vicinity of these locations. Encoder signals 59 can be used to identify these locations.

In some example embodiments, sub-scan distortions can be corrected by adjusting a relative movement of print head 26 with respect to display assembly 20. Adjusting a relative movement can include adjusting a relative speed between print head 26 and display assembly 20 during the image formation process. For example, in some drum-based scanning systems, helical image swaths are formed as a print head is translated along path aligned with a rotational axis of the drum as a recordable media that is mounted on the drum is rotated. By adjusting the print head translation speed, the helical swaths can be adjusted to scale the image to a desired size. In some example embodiments, uniform speed adjustments can be used to adjust an overall size of a formed image. In some example embodiments, non-uniform speed adjustments can be used to adjust for a local distortion associated with the image. For example, localized speed adjustments can be made at various points along a path to correct for distortions corresponding to those points. In the illustrated embodiment, various adjustments in the movement of print head 26 along support 53 can be made as print head 26 scans display 20 which is conveyed along a path aligned with main-scan axis 42. In this regard, the path of the resulting scan can be altered to account for distortions in regions of the image formed by that scan.

Typically, the pixel elements 22 are arranged in different patterns. In many cases, the pixel elements 22 will be regularly arranged along one or more directions. In such patterns, each of the pixel elements 22 includes a common reference, such as a common edge, a common corner, a center point or other common portion of the pixel elements 22. The pixel elements 22 are arranged such that each of the common references is separated from one another by an equal distance along an arrangement direction of the pattern. This equal distance is referred to as "pitch". Proper alignment requires that the formed color filter elements 12 have the same pitch as the pitch of the pixel elements 22. Analysis of the information derived from the detected pixel elements 22 can be used to determine a pitch of the arrangement of pixel elements 22. The determined pitch can vary from an expected pitch for various reasons. For example, environmental factors such as temperature and humidity can cause a global size of display assembly 20 to change, thereby affecting a pitch of the pixel elements 22. In some example embodiments, correction information 63 can lead to the formation of correction instructions that cause an actuator (not shown) to reorient print head 26 with respect to desired scan direction. Reorienting the print head can change the imaging resolution of the print head to form arrangements of color filter elements 12 that have pitches that substantially match the determined pitches of associated patterns of pixel elements 22. In other example embodiments, correction instructions can include instructions that control an optical zoom system (also not shown) to adjust the imaging resolution of print head 26 to form correctly pitched arrangements of color filter elements 12. In such example embodiments, correction instructions can cause an actuator to change the position of a lens in the optical zoom system.

Corrections such as these or others can be incorporated into correction information 63. Correction information 63 can also include correction information representative of corrections required to account for device inaccuracies. The mechanical alignment of various components in apparatus 50 is not perfect. For example, support structures may not be perfectly true, and position encoders are not perfectly accurate. These and other imperfections can be measured and compensated for with additional activation timing and movement adjustment techniques, for example. In this illustrated embodiment, correction information 63 includes a correction map that covers the two dimensional relative range of movement between print head 26 and display assembly 20 during the formation of a patterned layer of color filter elements 12 in alignment with display assembly 20. This correction map accounts for distortions in display assembly 20 and any device inaccuracies. In an example embodiment of the invention, the correction map includes a sub-scan correction map and a main-scan correction map. The sub-scan correction map includes information that is communicated by controller 60 to motion system 52 to define a relative motion path for print head 26 and carrier 51 during each scan. The main-scan correction map is sent to the imaging electronics 38 to set various timing delays for radiation beams emitted by imaging heads 26.

Step 140 includes an optional calibration routine (i.e. step 140 is shown in broken lines) for apparatus 50. The location of various pixels elements 22 comprising a particular activation state was determined in step 120 with the use of the vision system 54. Accurate alignment of various color filters elements 12 with pixel elements 22 requires that the positional relationship between the image forming radiation beams and the CCD field of view of sensor 55 be determined. Those skilled in the related art will realize that various factors can affect these positional relationships. For example, the position of the radiation beams is typically affected by changes in temperature both inside and outside of the print head 26. As the temperature of various components change over time, the directed radiation beams can wander. This effect is called "thermal drift".

In some example embodiments of the invention, this positional relationship is determined using a beam finder 64. FIG. 2C schematically shows a partial cross-sectional view of apparatus 50. In this illustrated embodiment, beam finder 64 is located under carrier 51.

Figure 4:
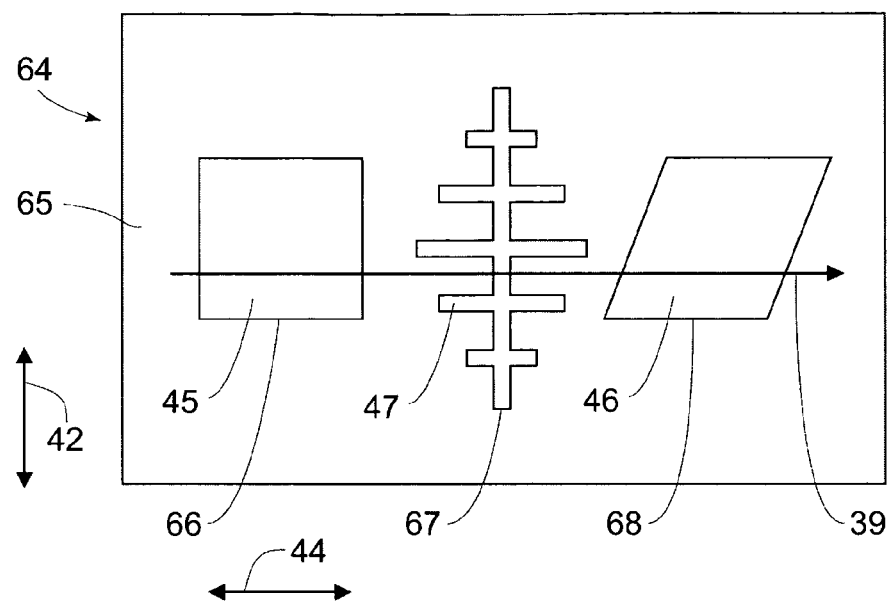
FIG. 4 is a beam finder as per an example embodiment of the invention.

FIG. 4 shows beam finder 64 as per an example embodiment of the invention. Beam finder 64 includes a mask 65 that defines areas that include a sub-scan positional target 66, a sensor target 67 and a main-scan positional target 68. Mask 65 can be produced by photo-lithographic techniques. The positions of sub-scan positional target 66, a sensor target 67 and a main-scan positional target 68 are accurately determined with respect to each other.

In this example embodiment of the invention, sub-scan positional target 66 includes one or more regions 45 (one in this case) that are aligned transversely to sub-scan axis 44 and main-scan positional target 68 includes one or more regions 46 (i.e. one in this example) that are aligned at a predetermined angle to sub-scan axis 44. Photodiodes (not shown) are positioned in the vicinity of regions 45 and 46 and are responsive to emit various signals when exposed by radiation. Sensor target 67 includes target region 47. Light sources (not shown) are positioned in the vicinity of region 47. Controller 60 is operable for activating the light sources to illuminate to illuminate region 47.

Figure 5:
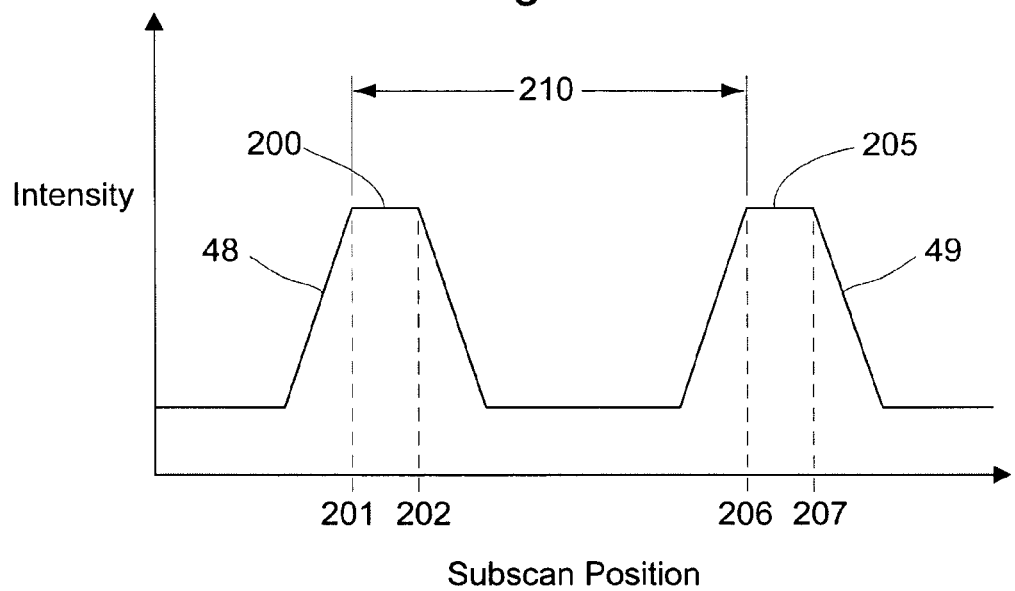
FIG. 5 shows a signal comprising a first peak and a second peak as generated by the beam finder of FIG. 4.

The positional relationship between its radiation beams and the field of view of sensor 55 is determined by establishing relative movement between the print head 26 and carrier 51 in the vicinity of a beam finder 64. Referring to FIGS. 4 and 5, print head 26 is moved along a path aligned with sub-scan axis 44 while exposing beam finder 64 with one or more radiation beams (not shown). FIG. 4 shows that the one or more radiation beams are scanned across beam finder 64 along path 39. As the one or more radiation beams are moved across beam finder 64, the photodiodes located in the vicinity of sub-scan positional target 66 and main-scan positional target 68 are sampled. As the one or more radiation beams are moved across sub-scan positional target 66, signals from the sampled photodiodes will have intensity levels defined by a first peak 48 that corresponds to a sub-scan position of the one or more beams. As the one or more radiation beams are moved across main-scan positional target 68, signals from the sampled photodiodes will have intensity levels defined by a second peak 49 that corresponds to a main-scan position of the one or more beams. An example of first peak 48 and second peak 49 is schematically shown in FIG. 5.

FIG. 5 schematically shows that first peak 48 includes an intensity plateau 200. The start point and end point of intensity plateau 200 are defined by sub-scan points 201 and 202 respectively. Sub-scan point 201 corresponds to a sub-scan position of the print head 26 in which all of the radiation emitted by its one or more radiation beams is first captured by the photodiodes associated with sub-scan positional target 66. Sub-scan point 202 corresponds to a sub-scan position of the print head 26 in which all of the radiation emitted by its one or more radiation beams is last captured by the photodiodes associated with sub-scan positional target 66. Signals provided by sub-scan encoders of motion system 52 are used by controller 60 to accurately determine the sub-scan position of the one or more radiation beams.

FIG. 5 schematically shows that second peak 49 includes an intensity plateau 205. The start points and end points of intensity plateau 205 are defined by sub-scan points 206 and 207 respectively. Sub-scan point 206 corresponds to a sub-scan position of the print head 26 in which all of the radiation emitted by its one or more radiation beams is first captured by the photodiodes associated with main-scan positional target 68. Sub-scan point 207 corresponds to a sub-scan position of the print head 26 in which all of the radiation emitted by its one or more radiation beams is last captured by the photodiodes associated with main-scan positional target 68. Controller 60 analyzes signals provided by sub-scan encoders of motion system 52 representative of these sub-scan positions and determines a distance 210 between the first peak 48 and second peak 49. Distance 210 varies as a function of the main-scan position in which the one or more radiation beams crossed the main-scan positional target 68. By comparing the distance 210 with the varying spacing between rectangular shaped region 45 and parallelogram shaped region 46, controller 60 can thereby determine the main-scan position of the one or more radiation beams.

After the sub-scan and main-scan positions of the one or more radiation beams have been determined, controller 60 illuminates sensor target 67. Sensor 55 and microscope 56 are used to locate sensor target 67 and signals provided by sub-scan and main-scan encoders of motion system 52 are used by controller 60 to thereby accurately determine the position of sensor 55 at this location. Controller 60 can then establish positional relationships between the radiation beams and sensor 55. Those skilled in the art will realize that other methods and apparatus can just as readily be employed to determine these positional relationships and are within the scope of the invention. In various example embodiments, correction information 63 is modified in accordance with the determined positional relationships. For example, various correction maps can include a two dimensional matrix of offsets that corrects for these positional relationships. In an example embodiment of the invention, these positional relationships are determined based on a reference frame related to main-scan axis 42 and sub-scan axis 44.

Various patterned layers of color filter elements 12 are formed in alignment with various patterns of pixel elements 22 in step 150. FIG. 2B shows that a pattern of red color filter elements 12A is formed in a desired alignment with corresponding pixel elements 22 that are associated with color filter elements 12A. In this illustrated embodiment of the invention a patterned layer of red color filter elements 12A is formed on surface 18 of display assembly 20 as image forming material is transferred from donor element 24 to surface 18 under the influence of radiation beams emitted by print head 26. In other example embodiments of the invention, patterned layers of color filter elements 12 can be formed on surface 18 by other techniques which can include ink jet techniques, for example. FIG. 2B shows that color elements 12A are formed by contiguous stripes of transferred donor material. In other example embodiments, color elements 12 can be formed in island configurations. For clarity, color elements 12A are patterned as per the KEY in FIG. 2B.

In this illustrated embodiment, the formed color filter elements 12A directly correspond to various pixel elements 22 in first set 27. In some example embodiments of the invention, other color filter elements (e.g. color filter elements 12 having different colors than color filer elements 12A) can be formed in alignment with various pixel elements 22 in second set 28, based on alignment information determined from the pixel elements 22 of first set 27. In this illustrated embodiment, color filter elements 12A are formed while the pixel elements 22 in first set 27 maintain their changed activation state as defined in step 110. This need not be the case in other embodiments of the invention however, as the activation state of the pixel elements 22 can be additionally changed between the determination of the alignment information and the formation of the color filter elements 12.

In this illustrated embodiment, print head 26 is controlled to emit radiation beams in accordance with image data 62 while scanning over surface 18. In this illustrated embodiment, various scanning parameters associated with each scan are adjusted in accordance with correctional information 63 to form the color filter elements 12A in correct alignment with corresponding pixel elements 22. In a similar manner, other color filter elements 12 (e.g. color filter elements 12B or 12C) are formed in accordance with image data 62 corresponding to those color filter elements and correction information 63. The correction information 63 can be the same as, or a modified version of the information that was used during the formation of previously formed color filter elements 12A. In some example embodiments, new correction information 63 is generated for the formation of each pattern of color filter elements 12. The steps illustrated in FIG. 3 are to be considered exemplary in nature and modifications in these steps or the sequence of these steps can occur in various example embodiments of the invention.

A program product 97 can be used by controller 60 to perform various methods described herein. Program product 97 can be used by controller 60 or other controllers to perform various functions required by the present invention. One such function can include providing instructions for the activation of a preselected grouping of a plurality of pixel elements 22 to change their activation state. Another function can include controlling a sensor 55 to detect various pixel elements 22. The various pixel elements can have a particular activation state. Another function can include determining alignment information based at least on the detected pixel elements 22. Yet another function can include determining correction information 63 based at least on the detected pixel elements 22. Information provided by the detection of pixel elements 22 comprising a particular activation state can be used to assist in alignment of a patterned layer of color filter elements 12 with a display assembly 20. Program product 97 can cause controller 60 to control an image forming apparatus (e.g. apparatus 50) to form a pattern of color filter elements 12 in alignment with a display assembly 20 on the basis of information provided by the detection of selectively activated pixel elements 22 of the display assembly 20.

Without limitation, program product 97 may comprise any medium which carries a set of computer-readable signals comprising instructions which, when executed by a computer processor, cause the computer processor to execute a method as described herein. The program product 97 may be in any of a wide variety of forms. Program product 97 can comprise, for example, physical media such as magnetic storage media including, floppy diskettes, hard disk drives, optical data storage media including CD ROMs, DVDs, and electronic data storage media including ROMs, flash RAM, or the like. The instructions can optionally be compressed and/or encrypted on the medium.

Print head 26 can include various arrangements of channels 40 including one-dimensional or two-dimensional arrays of channels 40. Some embodiments of the invention employ infrared lasers. Infrared diode laser arrays employing 150 μm emitters with total power output of around 50 W at a wavelength of 830 nm have been used in laser induced thermal transfer processes. Alternative lasers including visible light lasers may also be used in practicing the invention. The choice of laser source employed may be motivated by the properties of the media to be imaged.

The invention has been described in detail with particular reference to certain preferred embodiments thereof, but it will be understood that variations and modifications can be effected within the spirit and scope of the invention.

PARTS LIST 10 color filter
12 color filter element
12A red (R) color filter element
12B green (G) color filter element
12C blue (B) color filter element
13 surface
15 color filter matrix (matrix)
17 matrix cells (cells)
18 surface
20 display assembly
20A electrophoretic display assembly
20B liquid crystal display assembly
22 pixel element
22A electrophoretic display pixel element
22B liquid crystal display pixel element
24 donor element
26 print head
27 first set of pixel elements
28 second set of pixel elements
38 imaging electronics
39 path
40 channel
42 main-scan axis
42A forward direction
42B reverse direction
42 channel array
44 sub-scan axis
44A away direction
44B home direction
45 region
46 region
47 region
48 first peak
49 second peak
50 apparatus
51 carrier
52 motion system
53 support
54 vision system
55 sensor
56 microscope
57 illuminator
58 sensor signal
59 encoder signal
60 controller
61 activation signals
62 image data
63 correction information
64 beam finder
65 mask
66 sub-scan positional target
67 sensor target
68 main-scan positional target
81 electrode plate
82 electrode plate
83 electrophoretic medium
84 dielectric fluid
85 charged particles
86 partition
91 electrode plate
92 thin film transistor (TFT) plate
93 liquid crystal medium
94 backlight
95 pixel electrode
96 transistor
97 program product
100 step
110 step
120 step
130 step
140 step
150 step
200 intensity plateau
201 sub-scan point
202 sub-scan point
205 intensity plateau
206 sub-scan point
207 sub-scan pint
210 distance

The invention claimed is:

1. A method for aligning a patterned layer of color filter elements with a display assembly comprising a plurality of addressable pixel elements, the method comprising:
   activating a first set of the pixel elements to change an activation state of each pixel element in the first set of the pixel elements;
   determining a required alignment of the patterned layer of color filter elements with the display assembly based at least on the activated first set of the pixel elements; and
   aligning the patterned layer of color filter elements with the display assembly according to the required alignment.

2. A method according to claim 1, wherein the activation state of each pixel element in the first set of the pixel elements is changed to be different from an activation state of each pixel element in a second set of the pixel elements.

3. A method according to claim 1, wherein changing the activation state of each pixel element in the first set of the pixel elements comprises applying one or more activation signals to each pixel element in the first set of the pixel elements.

4. A method according to claim 1, wherein aligning the patterned layer of color filter elements with the display assembly comprises aligning a first set of the color filter elements with the first set of the pixel elements.

5. A method according to claim 2, comprising activating the first set of the pixel elements differently from the second set of the pixel elements to cause light to be selectively transmitted from different regions of a surface of the display assembly.

6. A method according to claim 2, comprising activating the first set of the pixel elements differently from the second set of the pixel elements to cause light to be differently reflected from different regions of a surface of the display assembly.

7. A method according to claim 1, comprising forming the patterned layer of color filter elements on a surface of the display assembly.

8. A method according to claim 1, comprising forming the patterned layer of color filter elements on a surface of the display assembly while maintaining at least one of the pixel elements with an activation state that is different than the activation state of another of the pixels elements.

9. A method according to claim 1, comprising forming the patterned layer of color filter elements on a surface of the display assembly with an exposure process.

10. A method according to claim 9, wherein the exposure process comprises a thermal transfer process.

11. A method according to claim 1, comprising providing a sensor for detecting the activated first set of the pixel elements.

12. A method according to claim 2, comprising providing a sensor for detecting the activated first set of the pixel elements and the second set of the pixel elements.

13. A method according to claim 1, comprising providing an illuminator for illuminating the activated first set of the pixel elements.

14. A method according to claim 11, comprising providing an illuminator for illuminating a surface of the display assembly while detecting the activated first set of the pixel elements.

15. A method according to claim 7, comprising:
operating a print head comprising a plurality of individually addressable channels to direct radiation beams towards the surface of the display assembly to form an image thereon; and
adjusting activation timing of a portion of the channels while forming the patterned layer of color filter elements on the surface of the display assembly.

16. A method according to claim 7, comprising:
operating a print head comprising a plurality of individually addressable channels to cause image forming material to be transferred to the surface of the display assembly to form image thereon; and
adjusting activation timing of a portion of the channels while forming the patterned layer of color filter elements on the surface of the display assembly.

17. A method according to claim 7, comprising:
providing a print head adapted to form images on the surface of the display assembly;
providing a motion system adapted for effecting relative movement between the print head and the display assembly; and
adjusting the relative movement between the print head and the display assembly while forming the patterned layer of color filter elements on the surface of the display assembly.

18. A method according to claim 17, wherein adjusting the relative movement of the print head and the display assembly comprises adjusting a relative speed between the print head and the display assembly.

19. A method according to claim 7, comprising:
providing a print head adapted to form images on the surface of the display assembly while scanning over the surface of the display assembly along a scan direction; and
reorienting the print head with respect to the scan direction.

20. A method according to claim 7, comprising:
providing a print head comprising a plurality of channels, each channel adapted to form a portion of an image on the surface of the display assembly;
providing a motion system adapted for effecting relative movement between the print head and the display assembly
adjusting at least one of activation timing of a portion of the channels and the relative movement between the print head and the display assembly based at least on the required alignment.

21. A method according to claim 7, comprising:
providing a print head comprising a plurality of individually addressable channels to direct radiation beams towards the surface of the display assembly;
providing an image sensor for capturing an image of a portion of the surface; and
determining a positional relationship between the radiation beams and the image sensor.

22. A method according to claim 2, wherein the activation state of one of the first set of the pixel elements and the second set of the pixel elements is on.

23. A method according to claim 2, comprising aligning the patterned layer of color filter elements with the first set of the pixel elements.

24. A method according to claim 2, comprising aligning the patterned layer of color filter elements with the second set of the pixel elements.

25. A method according to claim 1, wherein the display assembly is a reflective display assembly.

26. A method according to claim 1, wherein the display assembly is an electrophoretic display assembly.

27. A method according to claim 1, wherein the display assembly is a liquid crystal display assembly.

28. A method for aligning a patterned layer of color filter elements with a display assembly comprising a plurality of addressable pixel elements, the method comprising:
determining a required alignment of the patterned layer of color filter elements with the display assembly based at least on an activation state of a first set of the pixel elements; and
aligning the patterned layer of color filter elements with the display assembly according to the required alignment.

29. A method according to claim 28, comprising aligning the patterned layer of color filter elements with the display assembly according to the required alignment while forming the patterned layer of color filter elements on a surface of the display assembly.

30. A method for forming a plurality of color filter elements on a display assembly comprising a plurality of addressable pixel elements; the method comprising:
providing a support adapted for supporting the display assembly and a donor element positioned on the display assembly;
providing a print head adapted to image the donor element by directing radiation beams towards the donor element positioned on the display assembly;
activating a first set of the pixel elements to change an activation state of each pixel element in the first set of the pixel elements;

providing a sensor for detecting the first set of the pixel elements;

determining alignment information based at least on the detected first set of the pixel elements; and operating the print head to image the donor element to transfer image forming material from the donor element to the display assembly to form the plurality of color filter elements on the display assembly, wherein the print head is controlled to image the donor element with information that includes at least the alignment information.

31. Apparatus for forming a plurality of color filter elements on a surface of a display assembly comprising a plurality of addressable pixel elements, comprising:

a support adapted to receive the display assembly, a print head comprising an arrangement of channels;

control circuitry adapted to activate a first set of the pixel elements to change an activation state of each pixel element in the first set of the pixel elements;

a sensor adapted for detecting the activated first set of pixel elements; and:

a controller programmed for determining alignment information based at least on the detected activated first set of pixel elements, and for controlling the print head to form the plurality of color filter elements on the surface of the display assembly in accordance with the alignment information.

32. Apparatus according to claim 31, wherein the controller is programmed to adjust activation timing of a portion of the channels in accordance with the alignment information.

33. Apparatus according to claim 31, comprising a motion system adapted for effecting relative movement between the print head and the display assembly, and wherein the controller is programmed to control the motion system to adjust the relative movement between the print head and the display assembly in accordance with the alignment information.

34. Apparatus according to claim 31, wherein the print head is adapted to form the plurality of color filter elements on the surface of the display assembly while scanning over the surface along a scan direction, and wherein the controller is programmed to control an actuator to adjust an orientation of the arrangement of channels relative to the scan direction in accordance with the alignment information.

35. Apparatus according to claim 31, wherein the print head is adapted to cause image forming material to be transferred to the surface of the display assembly to form the plurality of color filter elements thereon.

36. Apparatus according to claim 31, wherein the print head is adapted to emit radiation beams to cause image forming material to be transferred from a donor element to the surface of the display assembly to form the plurality of color filter elements thereon.

37. A method for aligning a patterned layer of color filter elements with a display assembly comprising a plurality of addressable pixel elements, the method comprising:

activating a first set of the pixel elements to have an activation state that differs from an activation state of a second set of the pixel elements;

determining alignment information based at least on one of the activated first set of the pixel elements and the second set of the pixel elements; and aligning the patterned layer of color filter elements with the display assembly according to the alignment information.

38. A method according to claim 37, comprising detecting at least one pixel element in at least one of the activated first set of the pixel elements and the second set of the pixel elements with a sensor.

39. A method according to claim 37, comprising capturing an image of at least one pixel element in at least one of the activated first set of the pixel elements and the second set of the pixel elements with an image capture device.

40. A method according to claim 37, comprising aligning the patterned layer of color filter elements with the display assembly according to the alignment information while forming the patterned layer of color filter elements on a surface of the display assembly.

41. A method according to claim 7, comprising:

providing a print head adapted to form images on the surface of the display assembly while scanning over the surface of the display assembly along a scan direction; and operating a zoom system to adjust a resolution of the print head.

* * * * *